May 7, 1957
D. L. McKAY
2,791,333
CRYSTAL PURIFICATION APPARATUS AND PROCESS
Filed July 27, 1953
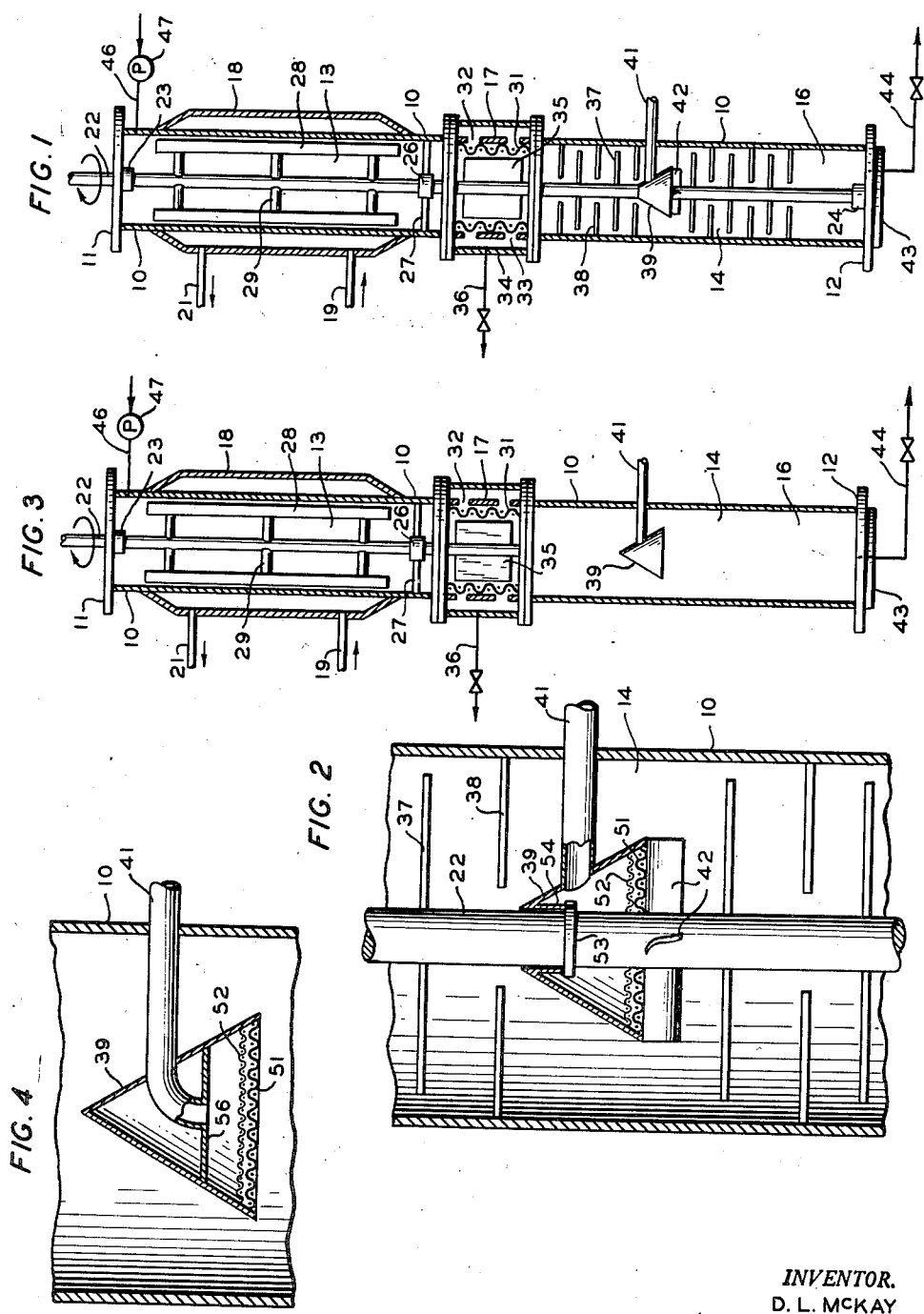
INVENTOR.
D. L. McKAY
BY Hudson and Young
ATTORNEYS United States Patent Office 2,791,333
Patented May 7, 1957

2,791,333

CRYSTAL PURIFICATION APPARATUS AND PROCESS

Dwight L. McKay, Bartlesville, Okla., assignor to Phillips Petroleum Company, a corporation of Delaware Application July 27, 1953, Serial No. 370,575

15 Claims. (Cl. 210—179)

This invention relates to an apparatus and process for separation and purification of crystals from liquid mixtures. In one of its more specific aspects, it relates to an improved apparatus and process for filtering liquid from a crystal slurry.

The invention disclosed herein is closely related to the invention disclosed in my copending application, Serial No. 375,850, filed August 24, 1953. Said application describes various types of fractional crystallization processes which are effected by moving a mass of crystals in more or less compact form through a crystal purification column while forcing washing liquid through the mass of crystals so as to wash out the impurities occluded therein. In some of the applications of this type of crystal purification process, the component to be recovered in pure form is withdrawn as a crystal melt from the forward end, or melt section, of the column, in which case the wash liquid is a portion of the melt which is forced countercurrently through the mass of crystals as a reflux. Another application of the process is in the concentration of liquids from dilute solutions such as fruit juices, wines, and liquors of various types, in which case the crystals formed comprise the aqueous component of the solution and the process involves, principally, washing occluded mother liquor or concentrated solution from the mass of crystals. In this manner, at least a portion of the ice crystals are melted in the melt section of the column and a portion of the resulting water is forced countercurrently through the crystal mass by displacement. Of course, all of the ice crystals may be melted in the melt section and the greater portion thereof removed as water. The concentrated liquor is conventionally withdrawn from the column through one or more wall filters.

The instant invention is concerned with improved apparatus and methods of filtering the liquor and reflux from the purification column in a continuous crystallization apparatus and process. One of the difficulties encountered in crystal purification processes of the type described is in uniformly washing and purifying the crystals in the compact mass thereof being forced through the column. It has frequently been found that reflux liquid follows the path of least resistance along the walls of the column so as to create channeling and bypassing of some of the crystals by the reflux liquid.

It is an object of the invention to provide an improved apparatus and process for the separation and purification of multicomponent-liquid-containing mixtures. Another object of the invention is to provide an improved filter in a crystal purification column and an improved method of filtering in such a column. A further object of the invention is to provide an apparatus and process which effects more uniform purification of a crystalline material containing occluded impurities. Other objects and advantages of the invention will become apparent from a consideration of the accompanying disclosure.

As pointed out above, one of the difficulties encountered in the purification of a mass of crystals passing through a crystal purification column and containing occluded impurities lies in channeling of the reflux liquid which is forced countercurrently through the mass of crystals in order to wash out the impurities. It has been found that the reflux liquid forms various separate and distinct paths through the mass of crystals, particularly along the walls of the column, so that insufficient contacting and washing is effected on a portion of the mass of crystals. Channeling is, at least in part, due to the location of the filter in the wall thereof and, partially, to bridging of crystals in the column, thereby causing the liquid from the melting section to follow the path of least resistance along the wall of the column to the filter.

I have found that disposition of the filter axially of the column, so as to cover a substantial portion of the cross sectional area of the column, greatly improves the filtering by substantially reducing channeling of the reflux liquid through the mass of crystals passing between the filter and the melt section of the column. The axially disposed filter of the invention may be utilized for withdrawing reflux or wash liquid and a portion, or all, of the mother liquor from any type of crystal purification column in which a relatively compact mass of crystals is forced or otherwise caused to move from one end of a purification column to the other end, or melting section, of the column. An axial filter may be utilized in an unobstructed column or any type of purification column utilizing a stirring means therein which slowly disperses individual crystals in the mass as the mass of crystals is moved through the column. An axially positioned filter may be utilized as the sole filtering means, or in combination with a wall filter which removes at least the major portion of the mother liquor from the column.

For a more complete understanding of the invention, reference may be had to the drawing in which:

Figure 1 is a diagrammatic elevational view, partly in section, of one arrangement of apparatus in accordance with the invention;

Figure 2 is a diagrammatic partial section of the filter element and surrounding structure of Figure 1;

Figure 3 is a diagrammatic elevational view, partly in section, of a modification of the apparatus of Figure 1;

Figure 4 is a diagrammatic sectional view of the filter element and surrounding structure of Figure 3.

Referring to Figure 1 of the drawing, an upright, elongated column 10 is provided with upper and lower closure members 11 and 12, respectively, and is divided into three principal sections, viz, a scraped surface chiller section 13, a crystal purification section or column 14, and a melting section 16. A wall filter section 17 is positioned intermediate the scraped surface chiller 13 and purification column 14. Scraped surface chiller 13 is formed by the wall 10 of the purification column and includes a jacket 18 having inlet and outlet conduits 19 and 21 connected therewith for circulation of refrigerant through the annular space between wall 10 and jacket 18. A shaft 22 is axially disposed within column 10 and is supported by means of upper and lower bearings 23 and 24, respectively, and an intermediate bearing 26 which is supported by a spider 27. A plurality of scraper blades 28, attached to shaft 22 by a series of cross members 29, are positioned in close proximity to the walls of column 10 in engaging relation therewith so as to scrape crystals off the cold wall 10 during refrigeration of the feed introduced to the column. Scraper blades 28 are shown coextensive with the jacketed area of the refrigeration section, but they might be either longer or shorter than this particular section of the column.

Filter section 17, connecting the outlet end of the chiller section and the inlet end of the purification section, comprises a filter screen 31 substantially cylindrical in shape and built into the wall of column 10. A series of openings 32 in wall 10 of the filter section permit liquid to flow into the annular space 33 formed by cylindrical wall 34 and wall 10 of the column. A series of scraper blades 35 extend out from shaft 22 and are substantially coextensive with filter section 17 or screen 31. Line 36 serves to withdraw filtrate from the filter section.

Crystal purification column 14 connects with filter section 17 so as to form a continuous column from the opposite end of the scraped surface chiller to the melt section of the apparatus. Shaft 22 extends through the purification section 14 and has disposed thereon, at vertically spaced intervals, radially directed rods or blades 37. A series of rods or blades 38 extend radially inwardly from the wall of column 10 a substantial portion of the distance to the shaft 22. These stationary rods 28 are spaced at vertical intervals, alternately with the rods 37, on rotatable shaft 22. Rotating rods 37 function to displace the crystals in the crystal column or mass being moved through column 10 and purification section 14 and thereby destroy the continuity of any channel which may have formed. In some instances, the mass of crystals forms a relatively compact, porous plug which tends to revolve with the shafts and its stirrers 37. The disposition of stationary rods 38 in the column, as shown, prevents the rotation of the crystal mass as a unit and therefore facilitates the movement of the mass of crystals through the purification section and also aids in preventing channeling of the liquid reflux being forced through the crystal mass.

Spaced apart from filter section 17 and melting section 16 is an axially positioned filter 39 having an outlet conduit 41. This filter surrounds the shaft 22 which is shown in more detail in Figure 2. A series of scraper blades 42, so positioned on shaft 22 just below filter 39 as to engage the screen on the filter, aids in keeping the filter screen relatively free of crystals so as to facilitate the filtering process.

The melt section 16 of the column is unobstructed and free of rods 37 and 38 and contains a heater element 43 which may be any type of heat exchange device, such as an electric heater, a coil for circulating an indirect heat exchange medium heated outside of the column, or a jacketed section through which a heat exchange medium is circulated. Melt is removed from the melt section through conduit 44 which leads to any storage or equipment for further processing the melt.

Feed is introduced in the form of a multicomponent liquid or slurry to the upper end of column 10 via line 46 under the pressure of a pump 47 which may be any type of device utilized in moving a slurry or a liquid through a line. The upper end of shaft 22 connects with a driving mechanism, not shown, which rotates the shaft and the elements fixed thereto at any desired rate of speed suitable for the process being effected.

Figure 2 shows in detail the structure and arrangement of filter 39 of Figure 1. This filter is generally in the form of an upright cone having a common axis with the shaft with its base perpendicular thereto. The filter screen comprises a relatively coarse screen 51 at the base of the cone and a fine screen 52 adjacent thereto on the upper side. The coarser screen, fabricated of larger wire, serves to protect the finer screen from damage by the force of the scraper and/or the crystals being forced through the column. In certain types of processes in which there is no great amount of pressure on the screen, a single screen will suffice. A collar 53, affixed to shaft 22, supports the filter 39 by contact with annular flange 54 depending from the apex of the cone.

The apparatus of Figure 3 is a modification of that shown in Figure 1 in which corresponding parts are identified by corresponding numerals. The apparatus of Figure 3 differs only in the structure in purification section 14. Shaft 22 extends only through chiller section 13 and filter section 17, without extending into purification section 14, which leaves the latter section substantially unobstructed except for the filter 39 and its withdrawal conduit 41. As shown in Figure 3, the filter 39 is supported by withdrawal conduit 41, but it may be supported additionally by a spider connecting with the conical wall of the filter either at the base or at any level intermediate the base and the apex of the cone.

Figure 4 shows the detail of the structure of the filter of Figure 3 wherein conduit 41 passes through the conical wall of the filter and extends arcuately through an imperforate diaphragm section 56 which serves to strengthen the filter structure.

In operation, a feed comprising a multicomponent liquid or a crystal slurry is introduced through line 46, under the pressure of pump 47, into the upper end of column 10 (when the column is in an upright position). In applications where the feed is introduced in the form of a slurry and not requiring further cooling and crystallization, little, if any, refrigeration is required in chiller section 13, but in applications where a feed is introduced as a liquid or as a thin slurry requiring further crystallization, refrigeration is provided in section 13 sufficient to reduce the temperature of the feed to produce the desired amount of solids. The crystal slurry in section 13 is moved through the column toward the melting section by the pressure created by pump 47, and mother liquor is withdrawn through filter section 17 and carried to storage or further treating apparatus by means of line 36, or is recycled where desired. Scraper blades 35 in section 17 assist in the filtering operation, whereby the mother liquor is withdrawn from the crystal mass, by preventing plugging of the openings in screen 31 with crystals. The crystals which are unable to pass through screen 31 are forced into the purification column 14 and form a relatively compact mass therein which passes filter 39 through the annular space between the base of the conical filter and the wall of the column. The conical shape of the filter assists in directing the crystal mass around the filter section and provides a space, just below the filter, which is relatively free of the compact crystal mass being forced through the column. This assists in the filtering step by providing a less compact mass of crystals in the area from which the liquid is removed from this section of the column.

As the crystal mass progresses toward the melt end of the column, it is washed and purified by contact with a relatively pure melt from the extreme end of the crystal mass as it enters the melting section 16. Melt reflux is forced countercurrently through the crystal mass between the melting section and the axial filter by displacement of a portion of the melt by the crystal mass and removal of only a portion of the melt through line 44. The melt reflux gathers impurities as it approaches the filter 39 and is taken off through the filter and line 41, together with the impurities washed from the crystals. The column may be operated so as to remove substantially all of the melt reflux through the axial filter 39, or it may be operated so as to remove the major portion of the reflux through the axial filter and a smaller portion through wall filter 17. It is also feasible to operate the column so as to remove all, or any portion, of the mother liquor through the axial filter, thereby eliminating filter section 17.

It is desirable to extend the filter element of filter 39 over as large a proportion of the cross sectional area of column 10 as possible, without unduly restricting the flow of crystals through the annular section surrounding the filter. In most applications, it is preferred to utilize an axial filter which has a filtering area which is at least half the cross sectional area of the column at the filter level.

EXAMPLE

Several runs were made with a feed consisting of cyclohexane and n-heptane, in which the concentration of the former averaged about 86 percent, in a purification apparatus of a construction substantially that of Figure 1.

The apparatus included a 4" diameter, 4' long scraped-surface chiller, a 4" diameter wall filter section, and an 18" long, 4" diameter purification section. Hydrocarbon feed was pumped into the top of the chiller and the crystals and low-melting product (mother liquor) flowed concurrently through the chiller into the filter section. The major portion of the mother liquor was withdrawn through the wall filter, and the crystals moved down the purification column countercurrently to a reflux stream flowing up the column from the melting section. A scraper prevented the crystals from plugging the wall filter and a cone filter was mounted in the purification section with its base about 10" above the bottom of this section and 8" below the wall filter. Refrigeration was obtained by expanding propane into the jacket of the chiller at atmospheric pressure, with a resulting temperature of about −44° F. Data obtained in the runs are presented in the table.

Table

| Run | | Rates, Gallons Per Hour | | | | Weight Percent Cyclohexane in N-Heptane | | | |
|---|---|---|---|---|---|---|---|---|---|
| No. | Length, Hours | Feed | Lower Melting Product | Reflux | Higher Melting Product | Feed | Lower Melting Product | Reflux | Higher Melting Product |
| 1 | 4.0 | 3.83 | 3.14 | 0.10 | 0.59 | 86.9 | 84.7 | 98.8 | 99.9 |
| 2 | 3.7 | 6.82 | 5.07 | 0.29 | 1.46 | 87.6 | 86.1 | 91.8 | 97.1 |
| 3 | 6.2 | 8.25 | 6.97 | 0.48 | 0.80 | 88.3 | 84.0 | 90.2 | 99.2 |

It was found that channeling of reflux, or wash liquid, through the purification section of the column was substantially eliminated by the use of the specific apparatus employed and particularly the axially positioned filter in the purification section.

The axially positioned filter of the invention has utility in any crystal purification section of a crystal purification column, regardless of how the crystals and/or slurry are fed through the column. In crystal purification apparatus, use is made of various types of crystal movers, such as a porous piston, a solid piston, an auger, a positive displacement pump, and various types of centrifugal pumps. The use of an axially displaced filter in the purification section of such apparatus has utility in substantially decreasing the amount of channeling, irrespective of the type of crystal moving devices used in the apparatus.

Various modifications of the invention not specifically disclosed herein are within the skill of the art. For instance, it is feasible to remove purified crystals from the outlet end of the purification column without melting the same; thereafter, melting at least a portion of the crystals and re-introducing the pure melt to the outlet end of the purification section as a reflux, and forcing the reflux through the crystal means to the axial filter by means of displacement. It is also feasible to prepare the crystal slurry, or mass, in any type of apparatus extraneous to the purification column, and thereafter introduce the crystal mass to the upper end of the purification section 14 or to the inlet to filter section 17, without passing the same through a scraped surface chiller, such as that shown as 13 in the drawing. Various modifications, not specifically disclosed, are believed to be within the scope of the appended claims.

I claim:

1. Crystal purification apparatus comprising an elongated, closed column having a purification section and a melting section; means for introducing a forced slurry of crystals into said purification section; means for moving said crystals thru said purification section to said melting section, an axial filter in said purification section upstream of and facing said melting section and having a filtering surface in a plane perpendicular to the axis of said column, said axial filter being spaced from the wall of said column so as to provide an annulus therebetween for passage of crystals; and a take-off line connected with said melting section.

2. Crystal purification apparatus comprising an elongated, closed column having a purification section and a melting section; means for introducing a forced slurry of crystals into the purification section; means for moving said crystals through said purification section to said melting section; an internal filter axially disposed in said purification section and spaced apart from said melting section and from the walls of said purification section, aforesaid filter being adapted to withdraw liquid forced countercurrently to the movement of crystals by displacement of melt in said melting section; a take-off line connected with said axial filter; a second filter upstream crystalwise of said axial filter having a take-off line for withdrawing mother liquor from the column; a heating means in said melting section; and a take-off line connected with said melting section.

3. The apparatus of claim 2 in which said internal filter comprises a cone having a filtering means in its base, the axis of said cone coinciding with that of said column and its apex being directed away from said melting section.

4. The apparatus of claim 3 in which the area of said filtering means is at least half the cross sectional area of said column at the level of the filter.

5. Crystal purification apparatus comprising an elongated, closed column having a crystal forming section, a crystal melting section, and a crystal purification section intermediate the other two sections; means for forcing a multicomponent feed containing a crystallizable component into said crystal forming section; heat exchange means in said crystal forming section for cooling said feed; an internal filter axially disposed in said purification section upstream of and facing said melting section and spaced from the periphery of said purification section for withdrawing a liquid forced countercurrently in the flow of crystals by displacement of melt in said melting section; a take-off line connected with said filter; a take-off line connected with said melting section and a second filter upstream of said internal filter having a take-off line for withdrawing mother liquor from said column.

6. The apparatus of claim 5 in which said internal filter comprises a cone having a filter in its base directed toward said melting section.

7. Crystal purification apparatus comprising an upright, elongated, closed column having a crystal forming section at the top, a crystal melting section at the bottom, and an intermediate crystal purification section; means for forcing a multicomponent feed containing a crystallizable component into said crystal forming section; heat exchange means in said crystal forming section for cooling said feed; an internal, axially disposed filter in said purification section having a filter surface perpendicular to the axis of said column and spaced apart from said melting section and from the walls of said column; heat exchange means in said melting section for melting crystals; a take-off line from said melting section; an axially disposed rotatable shaft in said column having a scraper device mounted thereon in engaging relation with the walls of said crystal forming section; a wall filter in said column intermediate said purification section and said crystal-forming section; a scraper device mounted on said shaft in engaging relation with said wall filter; a scraper device mounted on said shaft in engaging relation with the filter surface of said internal filter; and a take-off line from each of said filters.

8. The apparatus of claim 7, including stirrer rods mounted at spaced intervals on said shaft in said purification section.

9. The apparatus of claim 8, including stationary rods extending radially into said purification section at alternate intervals with said stirrer rods.

10. Crystal purification apparatus comprising a crystal purification column; an axial shaft in said column having radial stirring rods affixed at spaced intervals along the length thereof; stationary radial rods affixed to the walls of said column at spaced intervals alternate with said stirring rods; means for introducing crystals to one end of said column; means for melting crystals in the opposite end of said column; means for withdrawing the resulting melt from said opposite end; and an axial filter intermediate the ends of said column, including a filtering element generally perpendicular to the axis of said column and of smaller area than same so as to permit crystals to bypass said filter.

11. A process for purifying discrete crystals containing occluded impurities which comprises moving a mass of said crystals through a confined elongated purification zone toward a melting zone at one end thereof and thru an annular space in said purification zone surrounding a filtering zone, said filtering zone being in a plane transverse to crystal and liquid flow and facing downstream crystalwise; melting crystals in said melting zone; forcing a portion of the resulting melt through said purification zone and through said crystals to an axially positioned filtering zone in said purification zone so that said melt purifies said crystals and passes out of said purification zone through said filtering zone, said crystals passing through a zone surrounding said filtering zone; and recovering the remaining portion of said melt from said melting zone.

12. A process for recovering a concentrated liquid from a mixture of said liquid and crystalline material formed in said liquid, which comprises passing said crystals through a confined purification zone and around an axially disposed internal filtering zone therein; introducing a displacing liquid to the exit end of said purification zone; passing said displacing liquid through said crystals to said filtering zone, recovering displacing liquid from said internal filtering means; and recovering concentrated liquid from said purification zone thru a second filtering zone nearer the inlet end of said purification zone than said internal filtering zone.

13. The process of claim 12 in which a portion of the concentrated liquid is removed from said purification zone through said internal filtering zone, together with said displacing liquid.

14. A process for purifying an impure crystalline material admixed with mother liquid, which comprises introducing a mixture of crystals and mother liquor into an elongated, confined purification zone; forcing a continuous mass of impure crystals through said purification zone and around an axially disposed internal filtering zone therein to a melting zone at one end of said purification zone; removing mother liquor from said purification zone thru a filtering zone upstream crystalwise from said internal filtering zone; melting crystals in said melting zone; removing a portion of the resulting melt directly from said melting zone; forcing a further portion of the resulting melt through said purification zone and through the crystals therein to said internal filtering zone by pressure displacement resulting from the forcing of said mass of crystals through said purification zone; and removing resulting liquid, together with said impurities, from said filtering zone.

15. Crystal purification apparatus comprising an elongated, closed column having a crystal forming section, a crystal melting section, and a crystal purification section intermediate the other two sections; means for forcing a multicomponent feed containing a crystallizable component into said crystal forming section; heat exchange means in said crystal forming section for cooling said feed; an internal filter axially disposed in said purification section upstream of and facing said melting section and spaced from the periphery of said purification section; a take-off line connected with said filter; a take-off line connected with said melting section; and an axially disposed rotatable shaft in said column having scraper blades mounted thereon in engaging relation with the wall of said column and co-extensive with said crystal-forming section, said shaft extending into said purification section and having mounted thereon a scraper in engaging relation with the filter surface of said internal filter.

References Cited in the file of this patent

UNITED STATES PATENTS

| | | |
|---|---|---|
| 1,000,086 | Goetz et al. | Aug. 8, 1911 |
| 1,450,992 | Stevens | Apr. 10, 1923 |
| 1,562,870 | Daniels | Nov. 24, 1925 |
| 1,861,537 | Leek | June 7, 1932 |
| 2,560,147 | Anderson | July 10, 1951 |
| 2,613,136 | McKay | Oct. 7, 1952 |
| 2,615,793 | Weedman | Oct. 28, 1952 |
| 2,615,794 | Shelby | Oct. 28, 1952 |
| 2,617,273 | Findlay | Nov. 11, 1952 |
| 2,617,274 | Schmidt | Nov. 11, 1952 |
| 2,671,011 | Van Ackeren | Mar. 2, 1954 |